(12) United States Patent
Weinert (10) Patent No.: US 7,505,664 B2
(45) Date of Patent: Mar. 17, 2009

(54) FIBER OPTIC RACKSAVER

(75) Inventor: Steven Weinert, Arlington, TX (US)

(73) Assignee: Westek Electronics, Inc., Santa Cruz, CA (US)

( * ) Notice: Subject to any disclaimer, the term of this patent is extended or adjusted under 35 U.S.C. 154(b) by 0 days.

(21) Appl. No.: 11/980,249

(22) Filed: Oct. 30, 2007

(65) Prior Publication Data

US 2008/0089655 A1    Apr. 17, 2008

Related U.S. Application Data

(62) Division of application No. 11/341,837, filed on Jan. 27, 2006, now abandoned.

(60) Provisional application No. 60/649,187, filed on Feb. 2, 2005.

(51) Int. Cl.
*G02B 6/00* (2006.01)
(52) U.S. Cl. .................. 385/135; 385/134; 385/136; 385/137
(58) Field of Classification Search .......... 385/134–137
See application file for complete search history.

(56) References Cited

U.S. PATENT DOCUMENTS

| | | | | |
|---|---|---|---|---|
| 5,533,165 | A * | 7/1996 | Burris et al. | 385/134 |
| 5,668,910 | A * | 9/1997 | Arnett | 385/134 |
| 6,535,683 | B1 | 3/2003 | Johnson et al. | 385/136 |
| 6,856,747 | B2 | 2/2005 | Cloud et al. | 385/135 |
| 6,870,734 | B2 * | 3/2005 | Mertesdorf et al. | 361/684 |
| 2005/0025444 | A1 | 2/2005 | Barnes et al. | 385/135 |

* cited by examiner

*Primary Examiner*—Frank G Font
*Assistant Examiner*—Jerry Blevins
(74) *Attorney, Agent, or Firm*—Stallman & Pollock LLP (57) ABSTRACT

A series of racksaver components can be used to contain and protect runs of fiber optic cables and/or jumpers. Racksaver components can interconnect with pre-established and dedicated fiber ironwork racking and fiber raceway/fiber guide with no need for additional raceway/fiber guide, eliminating the need for additional supports, bracing, and ironwork infrastructure to support a separate fiber level. Existing copper/power racking and/or cabling can be used for the placement of the racksaver components for fiber optic cable and jumpers. In addition to rigid linear components, racksaver components can include flexible components allowing for bending of the fibers/jumpers and/or non-linear runs, and interoperable components for connecting with other devices.

6 Claims, 10 Drawing Sheets

FIG. 13 ly permit the ability to place strengthener rods throughout the length. The rods will give the product the ability to become freestanding between supports for ranges up to 15 feet. Also, the spooled version can have predesignated cut points along its length that will permit the attachment (when separated) to connect with fixed racksaver components and different products from other manufacturers.

FIBER OPTIC RACKSAVER

PRIORITY

This application is a divisional application of U.S. patent application Ser. No. 11/341,837 filed Jan. 27, 2006, now abandoned which in turn claimed priority to U.S. Provisional Application Ser. No. 60/649,187, filed Feb. 2, 2005, which is incorporated herein by reference.

TECHNICAL FIELD OF THE INVENTION

The present invention relates to the storage, installation, and protection of runs of optical fibers and jumpers.

BACKGROUND

When running and storing fiber optic cabling, a number of problems exist that must be addressed. Optic fibers often are run along side copper and other cabling, which can subject the optic fibers to damage, along with the risk of damage from other factors such as seismic activity. Subjecting the fibers physical forces can compromise the signal transmission properties of fiber optical conductors. In order to create a separate fiber level to shield the fibers from damage, it is necessary to design and implement additional supports, bracing, and ironwork infrastructure. These extra ironwork levels can result in a huge capital investment, especially for long runs of cabling.

DETAILED DESCRIPTION

Figure 1:
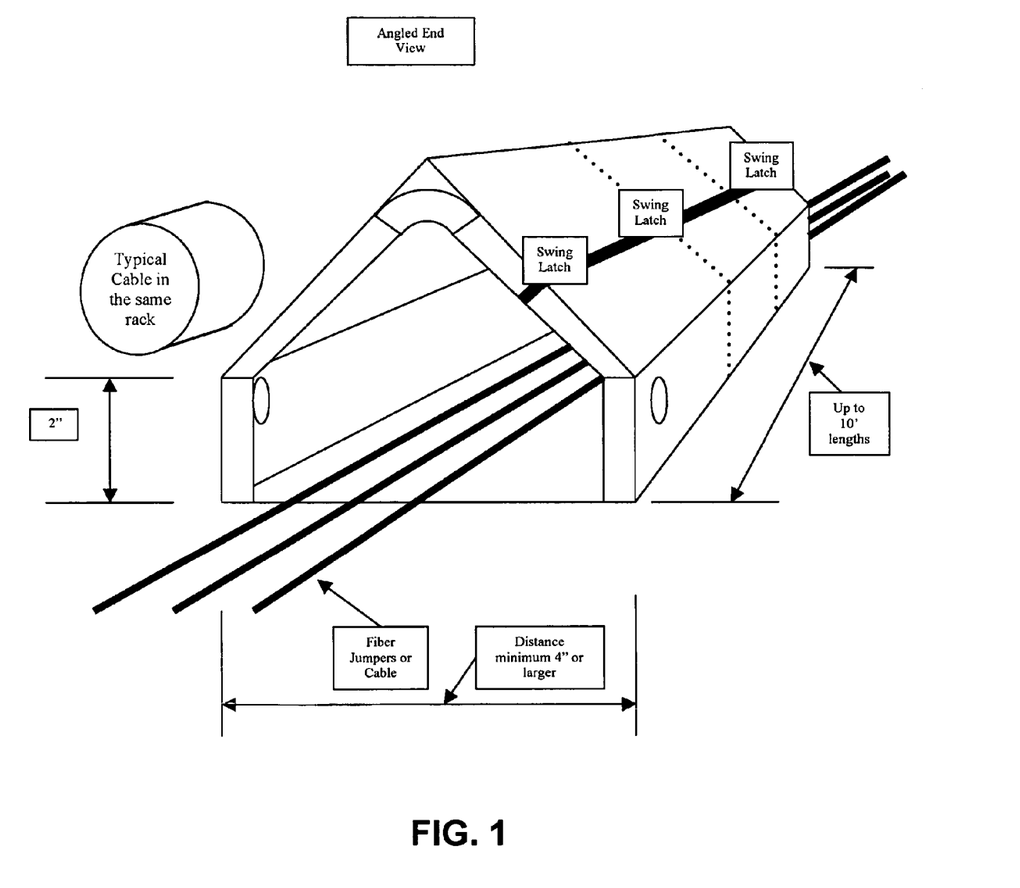
FIG. 1 is a perspective view diagram of a racksaver component in accordance with one embodiment of the present invention.

Systems and methods in accordance with embodiments of the present invention can overcome deficiencies in existing approaches by changing the way in which fiber optic cables and/or jumpers (simplex, duplex and assemblies variants) are contained. A racksaver device in accordance with one embodiment, as shown in FIG. 1, can interconnect with pre-established and dedicated fiber ironwork racking and fiber raceway/fiber guide (for jumpers) and negate the need for continuation of additional raceway/fiber guide at that location. This can eliminate the need for additional supports, bracing, and ironwork infrastructure to support a separate fiber level. Existing overhead or underfloor copper/power racking can be used for the placement of the fiber optic cable and jumpers. The racksaver can be positioned on one side of a rack, such as a 12, 18, or 24-inch wide horizontal ironwork rack, with a feeder slot open to the exterior of the ironwork side. The racksaver can be placed directly on the racking or on top of existing cabling, such as copper cabling that is already placed in this rack system. The racksaver eliminates the need for the huge capital cost for extra levels of ironwork. A racksaver also can protect the fiber cable and jumpers from extraneous stress forces and factors, such as a Category 4 Seismic Event. The devices can be manufactured with resilient non-flammable and non-toxic material that can survive both extremely heavy static loads, such as in excess of 850 lbs per square foot, and can survive dynamic stress forces exhibited by seismic events.

The product is manufactured using several variants for ease of installation. While the "house" or "modified pentagon" version is shown in the drawings, the product could also be configured as a cross-section of a circle, oval, triangle, square/rectangle "box", pentagon, hexagon, heptagon, octahedral, octagonal, or decagon. Preferably, the designs would include internal cross supports to handle both static and dynamic stress.

These devices will come in two primary formats. First, individual straight and flexible curved components will be provided that can be assembled by attaching one to another. As an alternative, the product could be sold in long lengths which are wound on large spools that can be unspooled and straightened at the work site to form the protection component. The spooled version will require some form of stiffener to make the product more rigid after being unspooled. In a preferred embodiment, splines will be provided along the length of the structure that will permit the ability to place strengthener rods throughout the length. The rods will give the product the ability to become freestanding between supports for ranges up to 15 feet. Also, the spooled version can have predesignated cut points along its length that will permit the attachment (when separated) to connect with fixed racksaver components and different products from other manufacturers.

Different racksavers with different sized openings can be used for fiber cabling and fiber jumpers, since minimizing the opening size can help to prevent damage to the cabling/jumpers and improve the strength of the racksaver. Fiber cable and fiber jumper assemblies also can be separated into separate rack enclosures, such that fiber cable and jumpers are not be secured to each other in any enclosure. A separate type of racksaver for fiber optic jumpers can be manufactured for use in controlled environment areas such as central offices, IT computer/data centers, remote terminals, and at customer premises.

Figure 3:
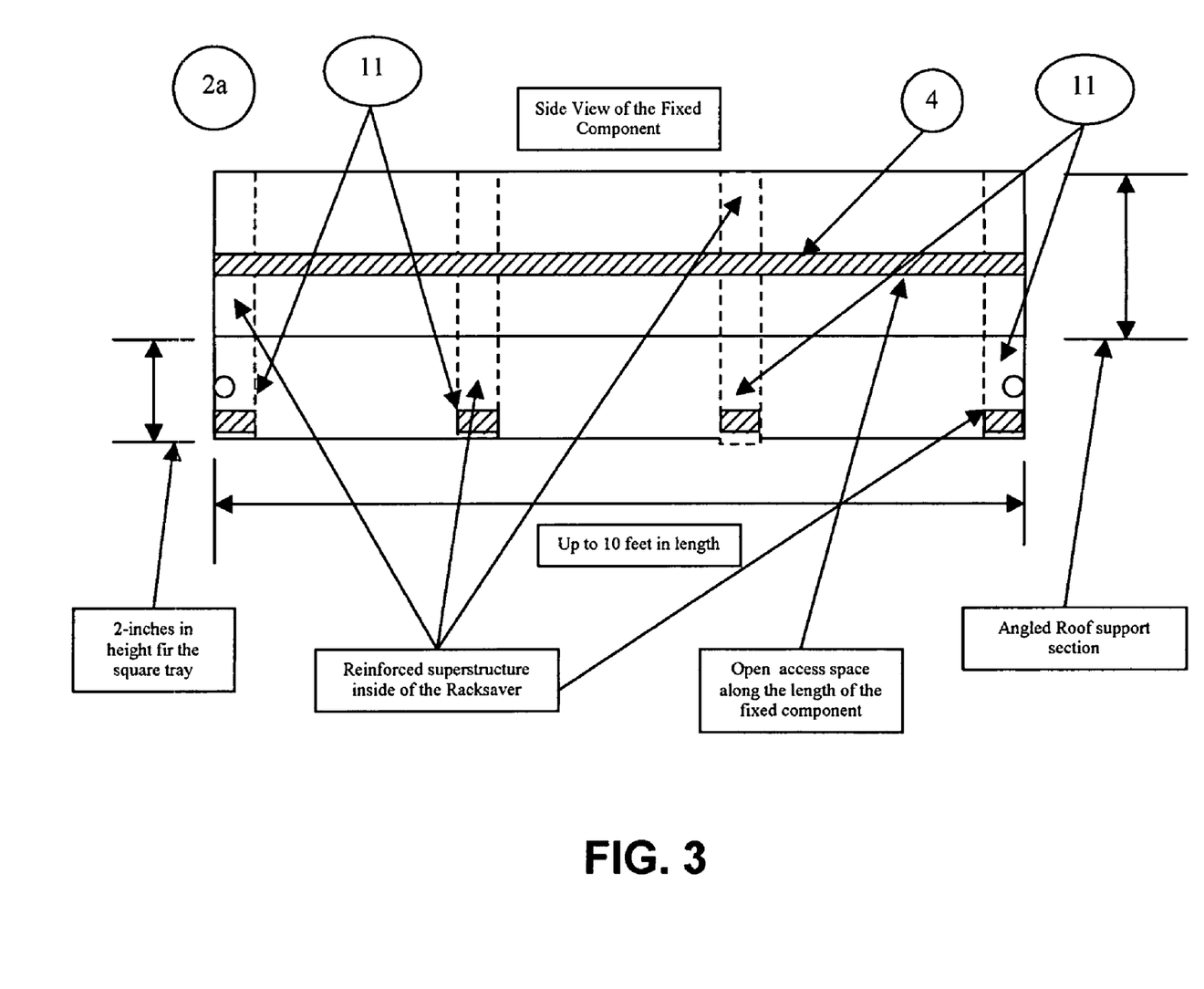
FIG. 3 is a side view diagram of a racksaver in accordance with one embodiment of the present invention.
Figure 5A:
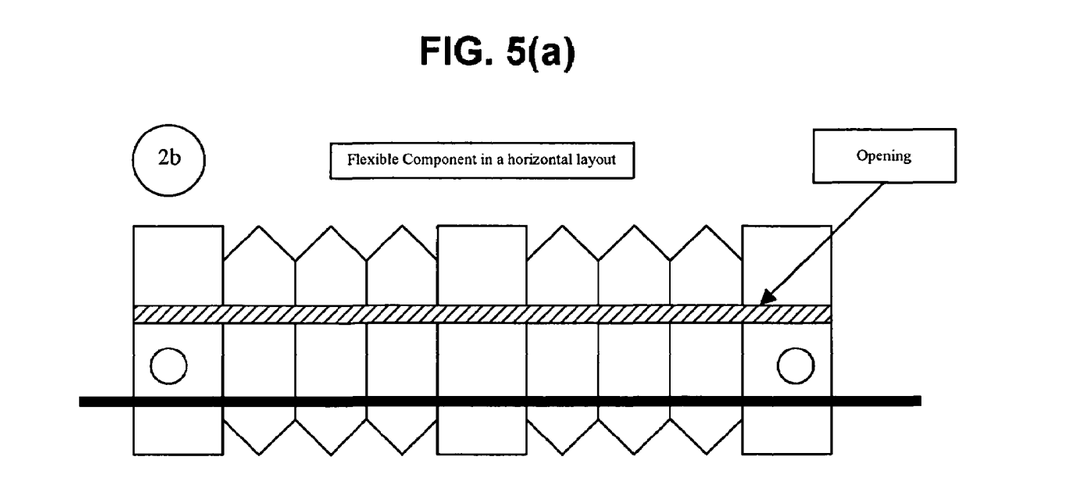
FIG. 5 is a diagram of a flexible racksaver component that can be used in accordance with one embodiment of the present invention.
Figure 5B:
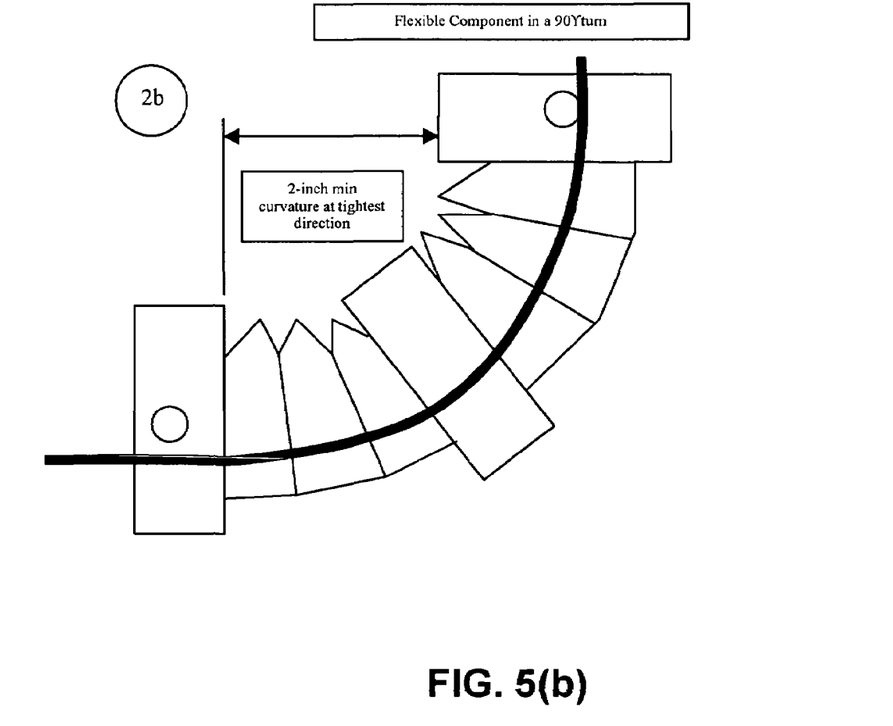

A racksaver can include a number of components. A standard straight component 2a as shown in FIG. 3 is used for placement into existing ironwork/metal overhead or underfloor rack systems. A flexible component 2b as shown in FIGS. 5(a) and 5(b) can be used to guide the cabling to traverse or change direction and/or elevation. The flexible components can have accordion like segments along the length.

Figure 4:
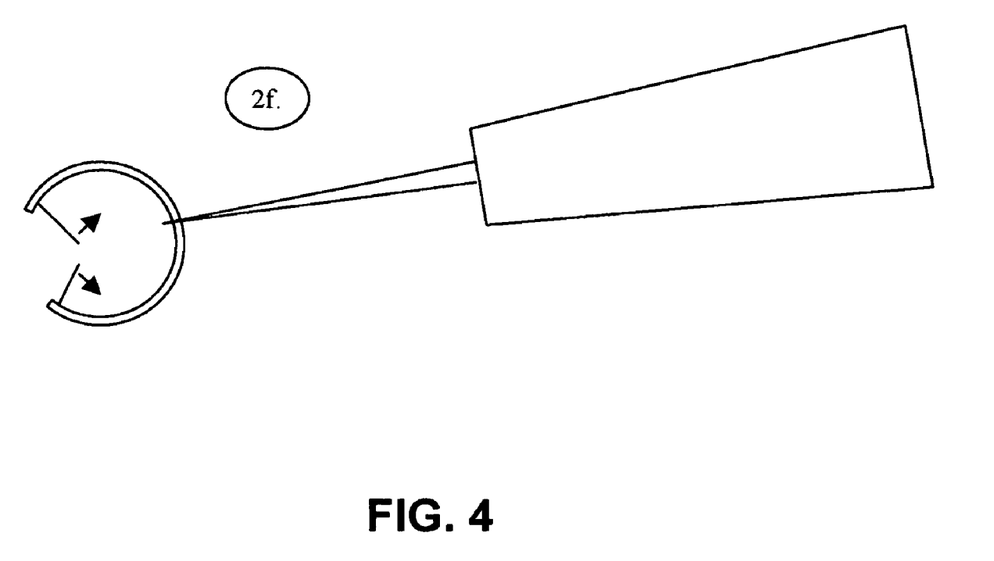
FIG. 4 is a diagram of a grappling tool that can be used with the racksaver of FIG. 1.
Figure 6:
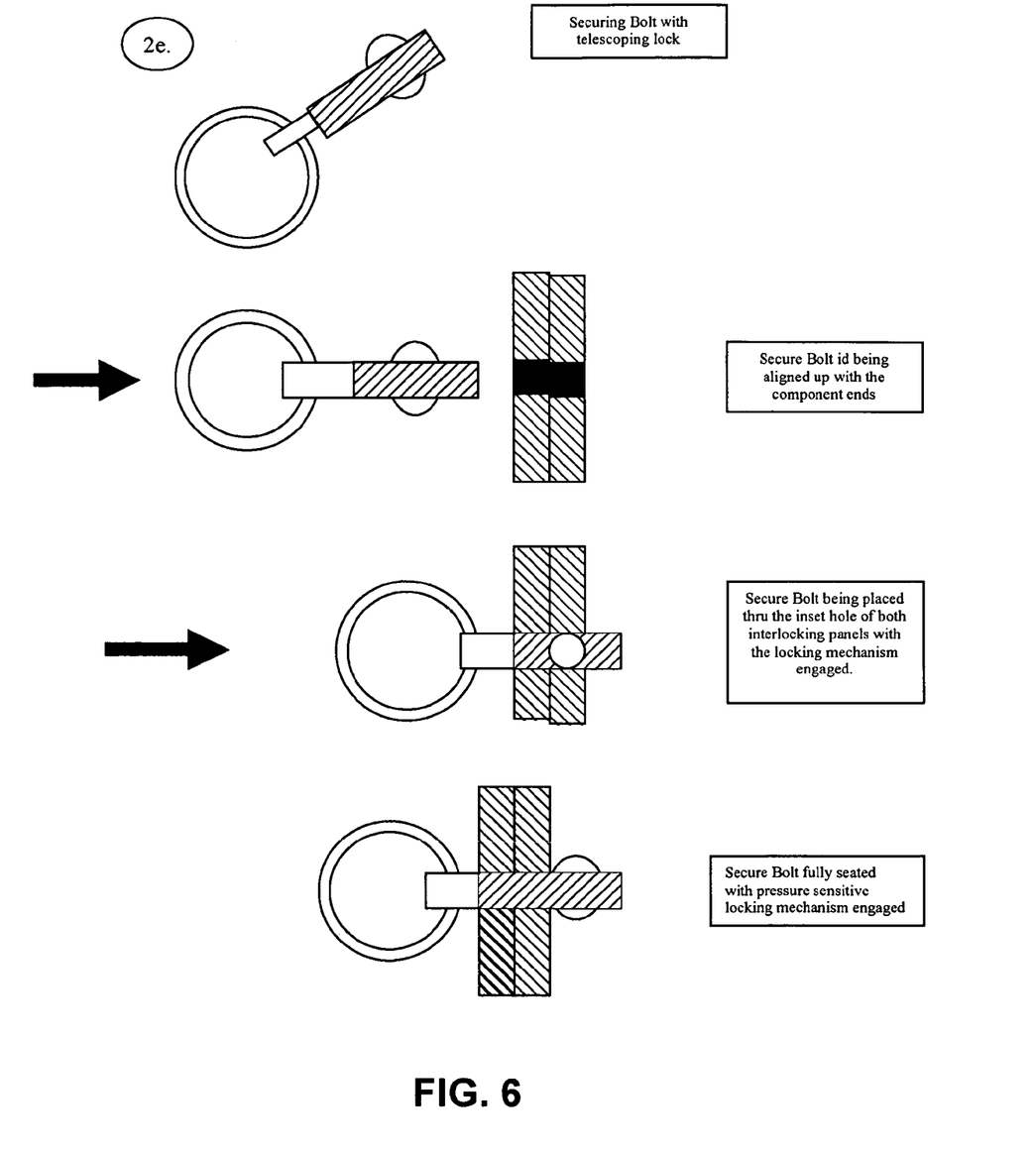
FIG. 6 is a diagram of a securing bolt that can be used with the racksaver of FIG. 1.
Figure 9:
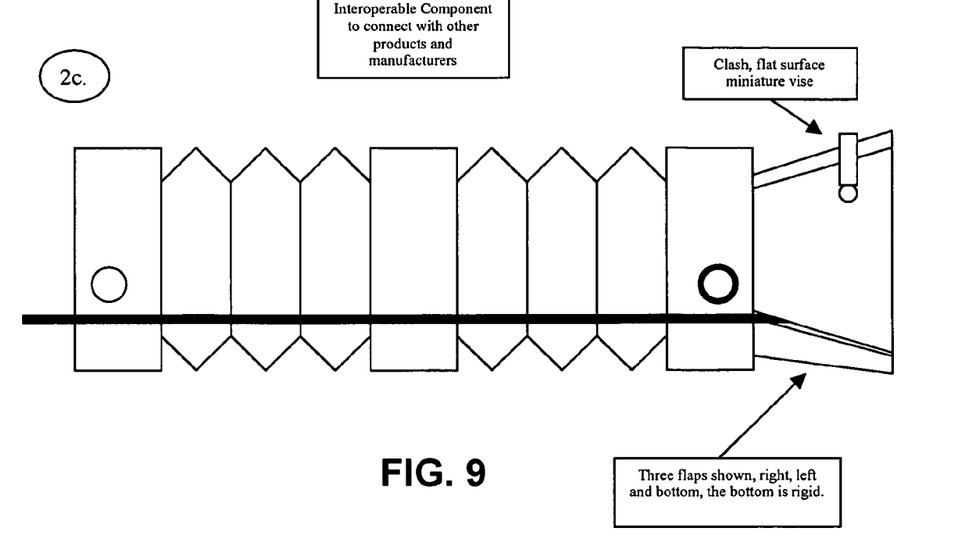
FIG. 9 is a diagram of an interoperable component that can be used with the racksaver of FIG. 1.
Figure 10:
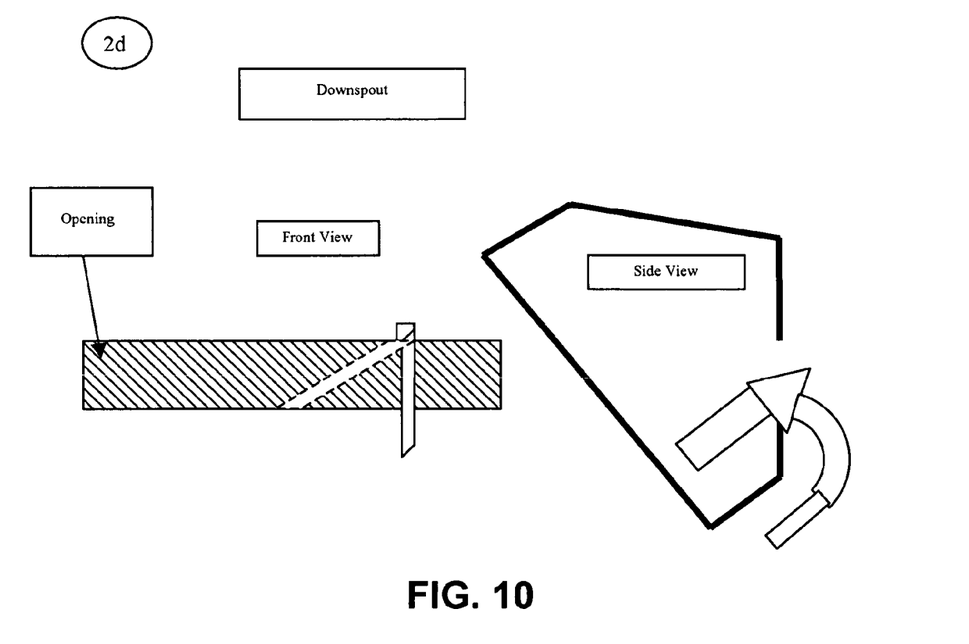
FIG. 10 is a diagram of a downspout that can be used with the racksaver component of FIG. 1.

An interoperable transition component 2c as shown in FIG. 9 can be used to connect or link multiple components together from other manufacturer's plastic or metal fiber jumper raceways or fiber guide products. A racksaver can have an exit downspout component 2d, as shown in FIG. 10, as well as a securing bolt 2e as shown in FIG. 6 for connecting the components to each other. A grappling tool 2f, as shown in FIG. 4, also can be used. There can be different kinds of standard straight components 2a, with at least one type for fiber cable and at least one with a smaller opening for fiber jumpers and assemblies.

Fiber optical cables and conductors can be routed on or in dedicated raceways to minimize the potential for installed cables being subjected to physical forces that may compromise the signal transmission properties of fiber optical conductors. Optical conductors are susceptible to light transmission degradation if the fibers are subjected to tight bends over time and momentary heavy forces at concentrated points, sometimes referred to as micro bends. Accordingly, most optical cable manufacturers include minimum bending radius recommendations or requirements in their product documentation. The minimum-bending radius for cables commonly used within network equipment environments is 1.5". Commercially available fiber protection raceway systems are constructed using the 1.5" bending radius standard.

Routing fiber optic interconnect cables with copper network cable would subject the cables to potentially extremely heavy vertical loads, which would tend to force fiber optic cables to conform to the irregularities formed within copper cable bundles. This also would probably be less than the minimum bending radius requirements and recommendations of cable manufacturers. Installing fiber optic cable with copper cable would also subject the relatively more fragile fiber cables to potentially damaging forces during copper cable mining activities as well.

Outside plant (OSP) fiber cables that are routed interior to network equipment areas for any distance are generally placed on or in dedicated raceways primarily to protect them from cable "churn" that occurs throughout the life of a building. Generally, once placed, OSP cables are there forever, whereas cable within network equipment areas is subject to removal as equipment technologies are replaced over time. OSP cables are therefore kept separate from other communications cables, when possible, to avoid being disturbed and needlessly handled during the cable mining activities of other communications cable. Mining cable from raceways often involves the use of wooden wedges forced into cable bundles to obtain physical access to cables that are no longer being used. A fiber optic racksaver can perform this protective and routing function without the need for additional ironwork placements.

Figure 2:
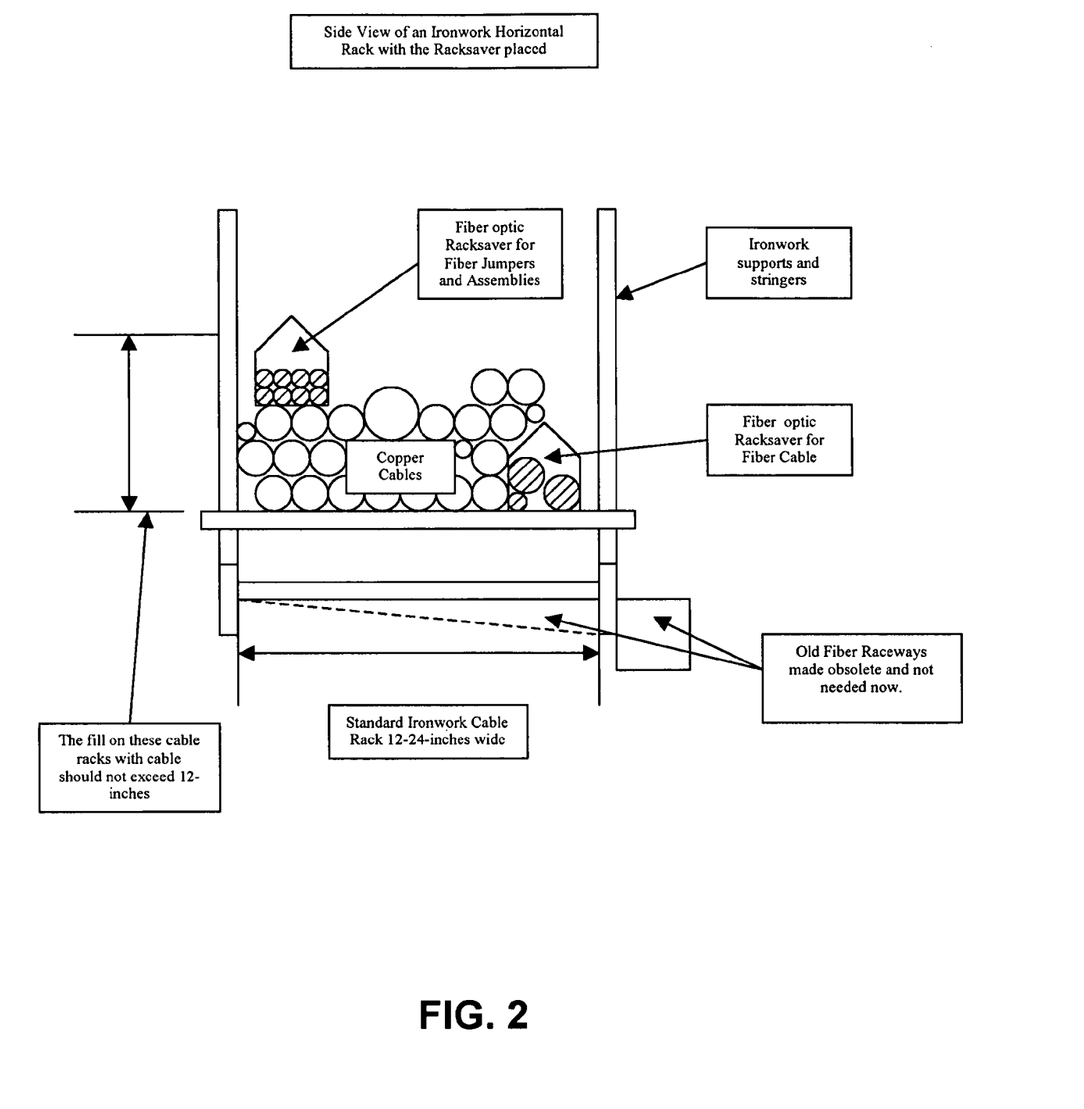
FIG. 2 is a diagram of two racksavers inside an ironwork support in accordance with one embodiment of the present invention.

A fiber optic racksaver can be placed within the standard ironwork rack system, preferably to one side in various embodiments, as shown in FIG. 2. In the Figure there are two racksavers, one for the fiber optic cable on the right side with the access opening to the right and one racksaver for fiber optic jumpers located to the left side of the rack support system with the open access to the left. Separate fiber raceways, shown in phantom in FIG. 8, would no longer be needed.

The open access point can be no larger than one inch for fiber cable and is no larger than ½ inch for jumpers in one embodiment. The open access point can run the length of rigid fixed component structures 2a. On the flexible component structure there may be no open access, such that the jumpers/cable must be threaded thru the curved areas and flexible components.

Securing bolts can be placed through the ends of two adjoining component panels to lock the panels together. As seen in FIG. 6, a securing bolt can have a ring on one end and an opposed pair of telescoping curved pressure-locking mechanisms on the other end. The locking mechanism would retract into the bolt when inserted through the aligned holes in the two panels to be connected. Once through the holes, the locking mechanism parts can extend fully to lock both component panels together.

The racksaver is installed in one of two methods. In the first using the fixed components, the products are placed into the copper metal overhead or underfloor super structure racking and then assembled to one another to make a extended length product. Flexible racksaver turns will be used to reroute the racksaver product to match the superstructure and building systems. Each racksaver component will then be connected with each other and then the racksaver product will be secured to the superstructure ironwork.

Figure 11:
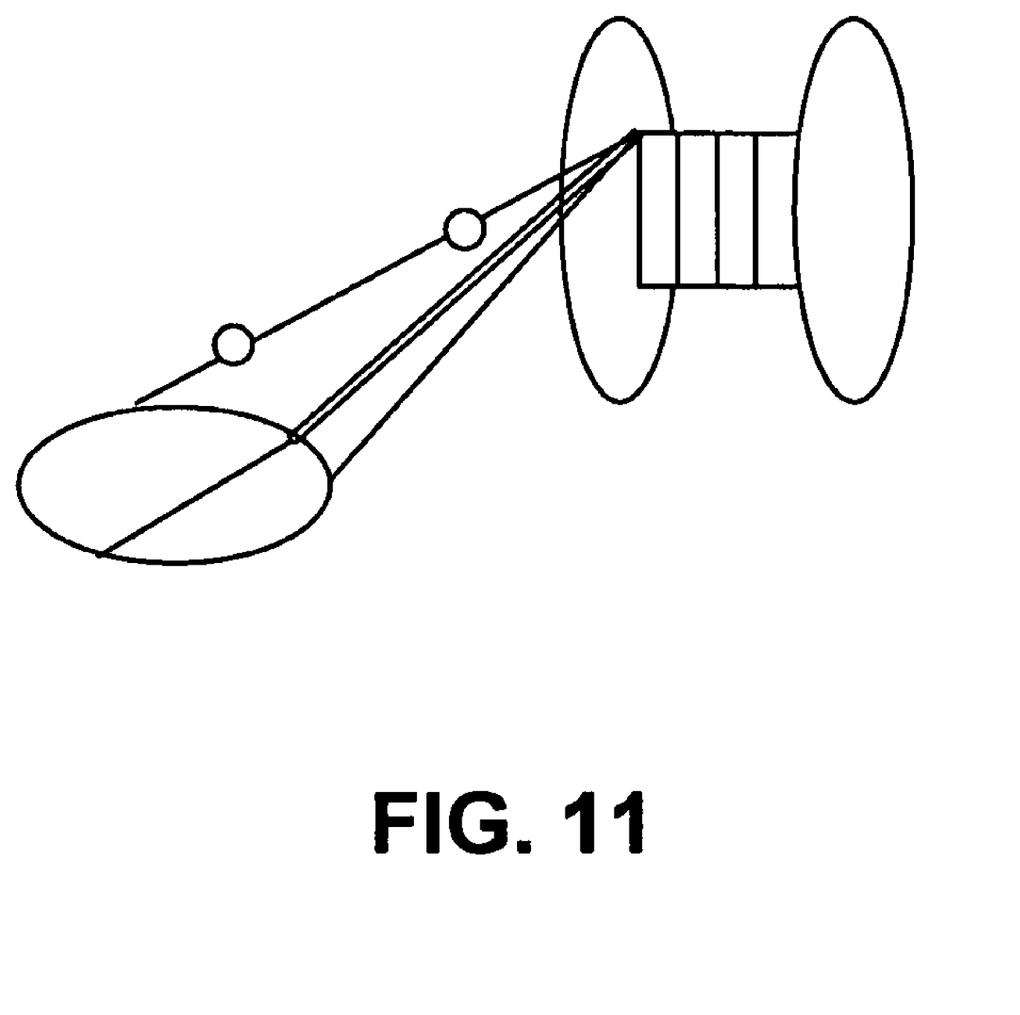
FIG. 11 is a diagram showing how the racksaver can be stored and unrolled from a spool.

Using the spooled racksaver version, the product will be unrolled from a 20 to 500 foot roll. One end will be placed in the superstructure ironwork and pulled throughout the route in the same manner that copper cable is placed in this ironwork superstructure. Where there are sharp turns, a support cast will be attached to the interior bend to protect the bend radius. This support cast will attach to the exterior of the racksaver using strengthener rod grommet attachments on the exterior of the product. This can be rapidly deployed using tie wraps or equivalent materials. Once the racksaver is in its final placement location, the strengthener rods are placed at such bridge points where there is a gap in the overhead or underfloor ironwork superstructure of 4 feet or more. The ends of the racksaver are cut at the premarked cut point and then subsequently attached to other fixed or other manufacturer products through the use of the flexible racksaver component. The product is then secured in the same manner to the ironwork superstructure. FIG. 11 illustrates a spooled system.

On one side of the angled roof of a racksaver can be an opening running the length of the component panels. The cable version of the panels can use a ½ inch high opening, while the jumper assemblies can use a ¼ inch version. At reinforcement points, there can be a latch that helps to perform the function of weight support on that side. If for any reason the latches are not engaged properly, the opening can close due to the weight, with the upper portion of the opening seating with the lower lip of the opening. The roof could be lifted at any point using a grappling tool to gain access in an unusual condition.

Figure 7:
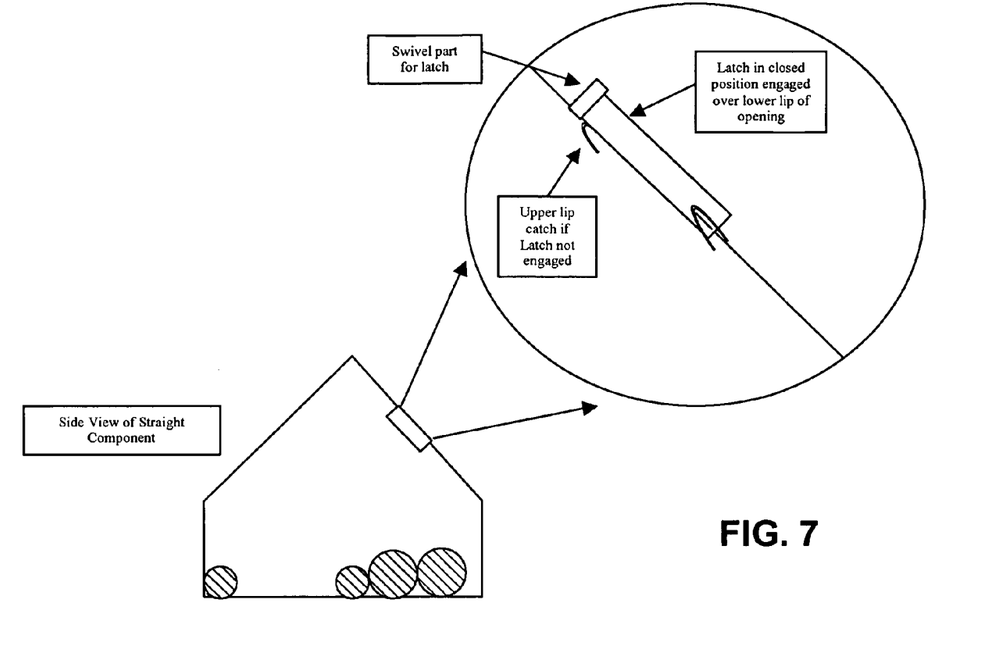
FIG. 7 is a diagram of a swivel latch that can be used with the racksaver of FIG. 1.
Figure 8:
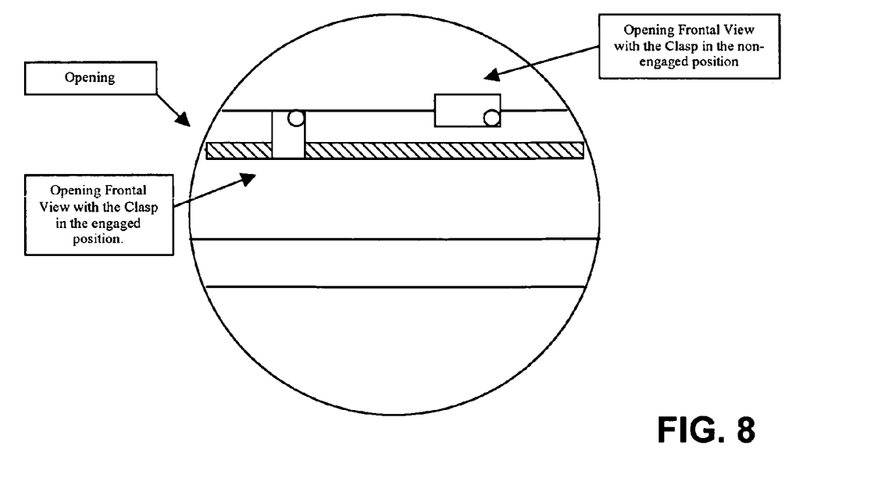
FIG. 8 is a diagram of the opening region of the racksaver of FIG. 1.

Latches can be placed at each reinforced superstructure at the open access point on the panels. As seen in FIGS. 7 and 8, the latches can pivot out of the way to permit the smooth, continuous placement of fiber cable/jumper assemblies without obstruction in a continuous flow method. The latch on the right hand side of FIG. 8 is shown pivoted out of the way of the access point. This method permits the uncoiling of the fiber and rapid placement into the component panels, in an extremely rapid and cost effective manner. The latches can include a spring latch that locks the top and lower portions of the opening, and that provides a strength load-bearing member when fully engaged. As seen in the exploded view of FIG. 7, when the latch is locked in place, it provides a bridge over the opening and strengths the structure.

An interoperable component 2c, as shown in FIG. 9, can provide the capability to interface with many other varied types of fiber raceways and fiber guides. The product can use the adjustable conversion component with screw down pressure sensitive attachments, or other appropriate attachment, which can match the other manufacturer's plastic, rubber, or metallic products with the racksaver. The interoperable component can use an adjustable flap on both sides and the bottom of the trough system. The bottom portion can slide underneath the outside of the other product, while the left and right flaps can wrap on their respective sides on the outside of the other product. Two clasps can be placed, on each side, near the top of the other manufacturer's product, firmly securing both products together. The clasps can be flat faced on the interior piece that secures on the inside of the component panels. On the exterior of the panel, these clasps can have a small screw down tightening ability to secure both panels to each other through strong pressure. This can be seen, for example, in FIG. 8.

Figure 13:
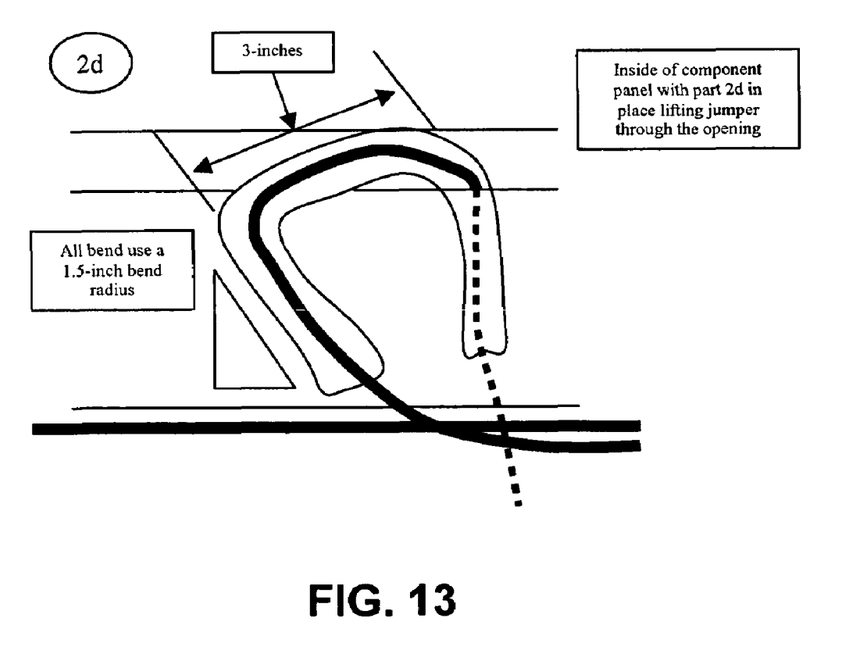
FIG. 13 is a diagram illustrating another form of downspout.

A downspout 2d, as seen in FIGS. 10 and 13, can be added to any opening and snapped on where needed. A downspout provides a conduit for a fiber element that is exiting the racksaver. A downspout can maintain the 1.5" bend radius by providing a lift-and-over capability to the lower rim of the opening in the components. These can be moved or added/removed as needed by sliding the downspouts along the lower rim/lip of the opening.

A grappling tool 2f, as seen in FIG. 4, can be a metal or other appropriate curved tool that permits the threading, placement, and removal of fiber cable or jumper assemblies when these products are within the fiber optic racksaver. A grappling tool can be shaped like the top of a coat-hanger, with a handle on one end and a split "Y" at the distant end, with curled ends that spring adjust at the "Y" inward toward each upward arm of the "Y". The opening can accept the fiber cable or jumper assembly. In use, the end of the grappling tool carrying the fiber is inserted into the opening at one end of the racksaver. The tool can then be run laterally, along the length of the opening in the racksaver, to rapidly load a length of fiber into the racksaver.

A flexible component can use three rigid structures attached with accordion-like flexible plastic materials that permit a flex in any one of 360 degrees of direction, up to 90 degrees in any one-direction. A flexible component can be designed to not bend with a radius less than two inches in any one direction.

Each component panel can have a wider attachment wall on the right end and a tighter on the left. Such design permits the interconnection of the ends of a wider section to a narrower section using a secure bolt.

Jumpers can be scooped up and, using a 1.5" bend radius, be lifted over the edge and straight down.

Figure 12:
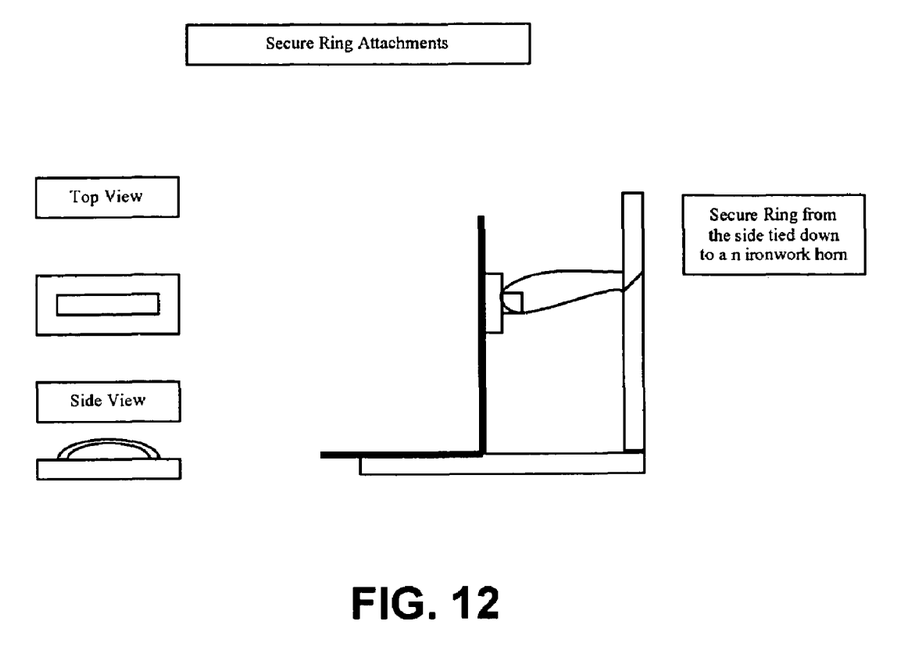
FIG. 12 is a diagram illustrating a secure ring attachment.

As seen in FIG. 12, secure ring attachments can be provided at each reinforced superstructure for tie-downs of the component systems as needed. These would be factory installed and would represent a different part from the other components that do not need tie down secure rings on the component panels. The secure rings will be molded into the reinforced superstructure exterior of each component panel needing this function/feature. The secure ring is a flat base with an elevated ring molded into the base It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of installing fiber optic cables into an existing rack, said rack holding copper cables therein, said method comprising the steps of:
    inserting within the rack and adjacent said copper cables an extended enclosure having open ends and a laterally extending opening, wherein said enclosure is inserted within the rack in a continuous manner unrolled from a spool; and
    laterally loading the fiber optic cables into the enclosure via said laterally extending opening whereby said fiber optic cables are kept separate and protected from the copper cables by the enclosure.

2. A method as recited in claim 1, wherein said enclosure is inserted within the rack as individual components and further including the step of connecting adjacent components.

3. A method of installing fiber optic cables into an existing rack, said rack holding copper cables therein, said method comprising the steps of:
    inserting within the rack and adjacent said copper cables an extended enclosure having rigid side walls, rigid flooring and an angled roof portion and wherein said roof portion includes a laterally extending opening extending the full length of the enclosure; and
    laterally loading the fiber optic cables into the enclosure via said laterally extending opening whereby said fiber optic cables are kept separate and protected from the copper cables by the enclosure.

4. A method as recited in claim 3 wherein said enclosure has open ends.

5. A method as recited in claim 3, wherein said enclosure is inserted within the rack as individual components and further including the step of connecting adjacent components.

6. A method as recited in claim 3, wherein said enclosure is inserted within the rack in a continuous manner unrolled from a spool.

* * * * *